(12) United States Patent
Peters et al.

(10) Patent No.: US 11,926,438 B2
(45) Date of Patent: Mar. 12, 2024

(54) DEVICE FOR DRIVING A SHAFT OF A JET ENGINE FOR INSPECTION PURPOSES

(71) Applicant: Lufthansa Technik AG, Hamburg (DE)

(72) Inventors: Jan Oke Peters, Hamburg (DE); Michael Thies, Hamburg (DE); Johann Pott, Wistedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 155 days.

(21) Appl. No.: 17/422,208

(22) PCT Filed: Dec. 30, 2019

(86) PCT No.: PCT/EP2019/087156
§ 371 (c)(1),
(2) Date: Jul. 12, 2021

(87) PCT Pub. No.: WO2020/148081
PCT Pub. Date: Jul. 23, 2020

(65) Prior Publication Data
US 2022/0073216 A1    Mar. 10, 2022

(30) Foreign Application Priority Data

Jan. 14, 2019 (DE) ..................... 10 2019 100 823.9

(51) Int. Cl.
*B64F 5/60* (2017.01)
*F01D 25/28* (2006.01)
*F02C 7/32* (2006.01)

(52) U.S. Cl.
CPC ............. *B64F 5/60* (2017.01); *F01D 25/285* (2013.01); *F02C 7/32* (2013.01); *F05D 2220/36* (2013.01); *F05D 2260/402* (2013.01); *F05D 2260/80* (2013.01)

(58) Field of Classification Search
CPC .......... B64F 5/60; F01D 25/285; F01D 25/36; F02C 7/32; F05D 2220/36; F05D 2260/402; F05D 2260/80
See application file for complete search history.

(56) References Cited

U.S. PATENT DOCUMENTS

| 4,446,728 A | 5/1984 | Ito |
| 2016/0305308 A1 | 10/2016 | Nowak et al. |

FOREIGN PATENT DOCUMENTS

| CA | 3010368 A1 | 1/2019 | | |
| CN | 104675556 A | 6/2015 | | |
| CN | 105745449 A | 7/2016 | | |
| CN | 106438105 A | 2/2017 | | |
| DE | 202013005524 U1 | 5/2014 | | |
| WO | WO 2017016710 A1 | 2/2017 | | |
| WO | WO-2018234681 A1 | * 12/2018 | ............. | F01D 25/36 |
| WO | WO 2018234681 A1 | 12/2018 | | |

* cited by examiner

*Primary Examiner* — Jacob M Amick
*Assistant Examiner* — Charles J Brauch
(74) *Attorney, Agent, or Firm* — LEYDIG, VOIT & MAYER, LTD.

(57) ABSTRACT

A device drives a shaft of a jet engine for inspection purposes. The device has: a drive having a part co-rotating with the shaft. The co-rotating part of the unit is configured to lie against a spinner of the shaft and is secured in a non-rotatable manner to at least one fan blade arranged on the shaft using at least one strap.

15 Claims, 4 Drawing Sheets

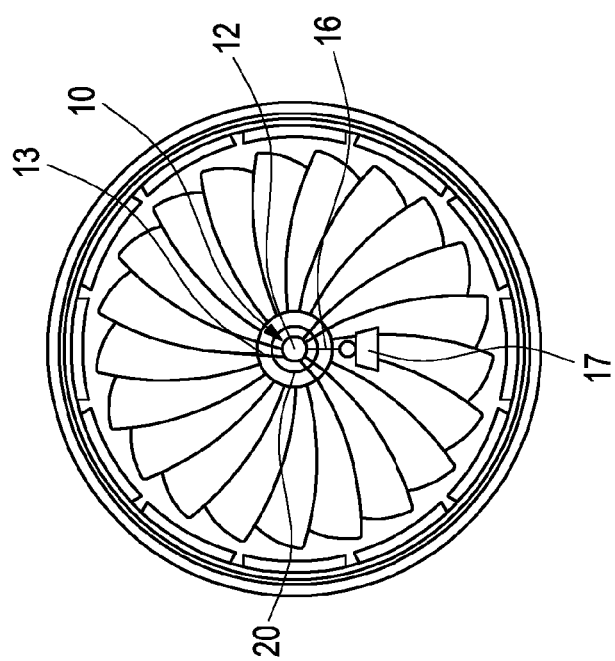
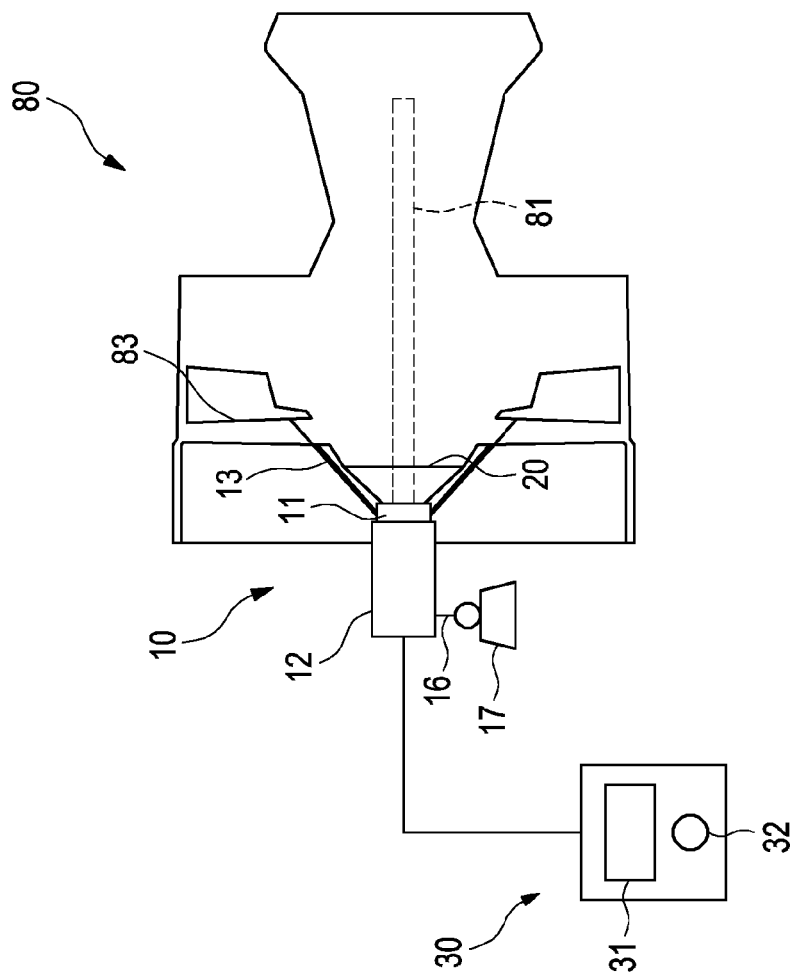
Fig. 2 b
Fig. 2 a

DEVICE FOR DRIVING A SHAFT OF A JET ENGINE FOR INSPECTION PURPOSES

CROSS REFERENCE TO RELATED APPLICATIONS

This application is a U.S. National Phase application under 35 U.S.C. § 371 of International Application No. PCT/EP2019/087156, filed on Dec. 30, 2019, and claims benefit to German Patent Application No. DE 10 2019 100 823.9, filed on Jan. 14, 2019. The International Application was published in German on Jul. 23, 2020 as WO 2020/148081 A1 under PCT Article 21(2).

FIELD

The invention relates to a device for driving a shaft of a jet engine for inspection purposes.

BACKGROUND

Jet engines of aircraft have to undergo routine inspections in order to check that they conform to technical safety requirements and to identify any damage at an early stage. For on-wing inspections, in particular, lateral flaps on the jet engine are opened and/or individual components removed, so that a technician can look into the inside of the jet engine either directly or with the help of a borescope.

In order to inspect the rotatable part of the jet engine, the jet engine may be guided past an inspection opening in the jet engine or a borescope may be inserted into the jet engine in such a manner that the entire circumference of the rotatable part of the jet engine is guided past the inspection opening or the range of vision of the borescope successively. It is also possible, of course, for the rotatable part of the jet engine to be moved in such a manner that a predefined portion of the rotatable part can be inspected through the inspection opening or the borescope.

Inspecting the rotatable part of the jet engine, which comprises the fan blades and at least one low-pressure turbine stage, routinely requires two technicians. The one technician uses a borescope to inspect the individual turbine blades of the turbine stages in question one after another, while the other technician guides the individual turbine blades past the borescope by turning the fan blades connected non-rotatably thereto. The disadvantage of this is that two members of the workforce are tied up in inspecting the aforementioned turbine blades.

SUMMARY

In an embodiment, the present disclosure provides a device that drives a shaft of a jet engine for inspection purposes. The device has: a drive having a part co-rotating with the shaft. The co-rotating part of the unit is configured to lie against a spinner of the shaft and is secured in a non-rotatable manner to at least one fan blade arranged on the shaft using at least one strap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2a and FIG. 2b show a second exemplary embodiment of a device according to the invention;

DETAILED DESCRIPTION

Figure 1:
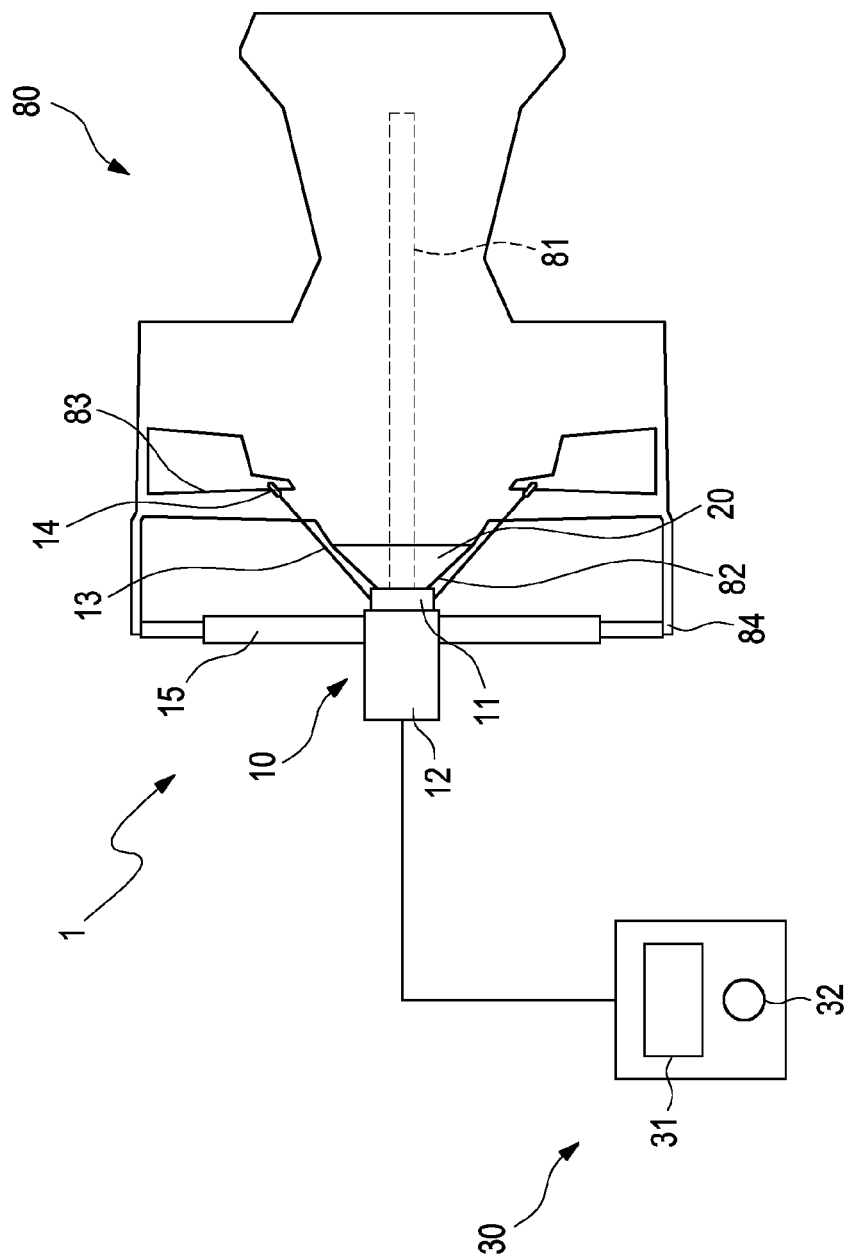
FIG. 1 shows a first exemplary embodiment of a device according to the invention.

Embodiments of the present invention provide a device with which the disadvantages known in the prior art can be avoided or at least mitigated.

Embodiments of the present invention provide a device for driving a shaft of a jet engine for inspection purposes, comprising a drive unit having a part co-rotating with the shaft, wherein the co-rotating part of the drive unit is designed to lie against the spinner and is secured in a non-rotatable manner to at least one or multiple fan blades using at least one strap.

Furthermore, embodiments of the present invention provide a device for driving a shaft of a jet engine for inspection purposes, comprising a drive unit having a clamping element for the detachable and non-destructive fastening of the drive unit to a fan blade of the jet engine and having a friction wheel driven by the drive unit, the friction wheel being designed to lie against the housing of the jet engine.

Aspects of the present invention are based on a recognition that the rotation of the shaft of a jet engine, on which shaft the fan blades of the engine are arranged, can be achieved by a suitable device. By turning this shaft, components of the jet engine connected thereto directly or via a gear mechanism, for example the turbine blades of a stage of a low-pressure turbine, are set in rotation. The components in question can thereby be inspected, as described. In this case, the knowhow on which aspects of the present invention are based is that a suitable device must be handy and easy to operate, in order to offer substantial advantages over the prior art. This is precisely what is achieved by the devices according to the invention.

A number of terms used in connection with the invention will be explained to begin with.

"Jet engine" refers to an aircraft engine based on the principle of a gas turbine. In particular, the term encompasses turbofans in which the actual gas turbine is surrounded by an external airflow, wherein the outer air flow is accelerated by the fan of the engine which comprises a plurality of fan blades. The fan may be encased or have an open-rotor design. A turboprop is also a jet engine within the meaning of the present invention, wherein the individual blades of the propeller are likewise referred to as fan blades in connection with the invention, for reasons of transparency.

The term "strap" should be broadly interpreted. It includes any kind of belts and ropes which are flexible enough to be used in the devices according to the invention.

"Spinner" refers to the streamlined casing of the shaft of the jet engine at the engine intake.

In a first embodiment, the device according to the invention comprises a drive unit, which is divided into a part co-rotating with the shaft of the jet engine and a non-co-rotating part. The drive unit in this case is configured in such a manner that the two parts of the drive unit can be driven relative to one another, so that a relative rotational movement is produced between the two parts.

The co-rotating part of the drive unit is designed to lie against the spinner. If the device is designed for a particular type of jet engine, the co-rotating part of the drive unit may have a negative form adapted to the shape of the spinner of the jet engine. A form-fitting attachment of the device is then possible. If the device according to the invention is to be capable of being used for different types of jet engine, the co-rotating part of the drive unit may exhibit one or multiple smaller contact surfaces which are configured and/or adjustable in such a manner that attachment to as many different types of jet engines as possible can be achieved.

The co-rotating part of the drive unit is secured in non-rotatable fashion to one or multiple fan blades. In other words, the co-rotating part should be fastened to the shaft of the jet engine in such a manner that substantially no relative rotational movement results between the co-rotating part of the drive unit and the shaft of the jet engine.

A corresponding fastening can take place when the at least one strap can be fastened, or is directly fastened, to the co-rotating part at one end, and has a hook element for hooking to a fan blade at the other end. The strap can be hooked onto the rear edge of a fan blade using the hook element and the tensile forces occurring in the strap during the desired non-rotatable securing can thereby be absorbed.

Alternatively, it is possible for the at least one strap to be fastenable to the co-rotating part of the drive unit at both ends. In this case, the one end of the strap can preferably be fixedly connected to the drive unit, which means that only the other end of the strap is then a free end.

The strap may be guided about a fan blade and fastened to the co-rotating part of the drive unit at both of its ends. Here, too, a non-rotatable securing of the co-rotating part of the drive unit results.

Even though securing with one strap can be sufficient in individual cases, it is preferable for two, three, or four straps to be provided for the non-rotatable securing of the co-rotating part of the drive unit. As a rule, a reliably non-rotatable securing can be achieved through a corresponding number of straps, wherein at the same time the cost of fastening the device according to the invention to the jet engine is kept sufficiently low. So that a strap can be detachably fastened to the co-rotating part of the drive unit, a hook may be provided on the drive unit, for example, for engagement with an eye in the strap.

In particular, it is possible in principle for a securing of the co-rotating part of the drive unit to the shaft of the jet engine, which is sufficiently non-rotatable for the present invention to be achieved simply via straps, through a suitable arrangement of multiple straps between the co-rotating part of the drive unit and fan blades. It is preferable, however, for the contact surface of the co-rotating part of the drive unit provided to lie against the spinner to be provided with a surface coating that improves grip. In this way, the static friction between the co-rotating part of the drive unit and the spinner which promotes non-rotatable securing can be increased, with the axial force relevant to the static friction being achieved primarily via the straps. Alternatively, an element improving grip, for example in the form of a cap that can be fitted over the spinner, can be provided between the co-rotating part of the drive unit and the spinner. The surface coating improving grip or the element improving grip may be made of elastomer, for example, preferably with a rubber base.

So that the device according to the invention and, in particular, the drive unit can apply a torque ultimately leading to the rotation of the shaft of the jet engine, the non-co-rotating part of the drive unit should be stationary—in other words not to be movable—or for it at least to be able to apply a suitable counter-torque.

In a first variant, it is provided that the non-co-rotating part of the drive unit has a linkage assembly, preferably a telescopic linkage assembly, for being supported against the housing of the jet engine. Through a corresponding linkage assembly, the non-co-rotating part of the drive unit can be secured in a stationary manner and, therefore, also in a non-rotatable manner, among other things, in respect of the housing of the jet engine. A rotation of the two parts of the drive unit relative to one another then immediately results in a turning of the shaft of the jet engine.

The linkage assembly in this case can be fixedly connected to the drive unit. It is preferable, however, for the linkage assembly to be fastenable to the drive unit in a detachable manner. The device according to the invention can then be routinely assembled in a smaller size, as a result of which transportation of the device is made easier. It is also possible that—insofar as the linkage assembly is composed of standard parts—for remote deployment of the device, only the drive unit has to be transported using the at least one strap, where necessary, and a linkage assembly on site composed of corresponding standard parts can be utilized.

In an alternative variant, an extension arm for a counterweight is provided on the non-co-rotating part of the drive unit, the counterweight being suitable for applying a torque to the shaft. For example, a corresponding counterweight can be fastened to the free end of the extension arm, so that each time the extension arm is deflected from the perpendicular, torque acting on the shaft of the jet engine is produced. It is also possible for two counterweights to be provided at each end of a centrally mounted crossbar as the extension arm, so that the movement of the extension arm out of the horizontal produces a torque on the shaft of the jet engine. Other design variants of the extension arm and counterweight are of course conceivable. Irrespective of how the extension arm is ultimately embodied, however, it is true that a deflection of the extension arm is achieved in principle through a rotation of the two parts of the drive unit relative to one another and due to the moment of inertia of the shaft of the jet engine.

The counterweight may be an integral component of the device. It is preferable, however, for the counterweight to be exchangeable in design, such that a weight that is already present at the site where the device is to be deployed, or another mass, can be used as the counterweight. It is also possible for the counterweight to be configured as a receptacle for liquid—for example as a liquid bag—wherein the mass that is ultimately required is achieved by selective filling of the receptacle with liquid, such as water for example.

It is preferable for the device to have an angle transmitter for detecting the angle of the co-rotating part of the drive unit in relation to the non-co-rotating part of the drive unit. Furthermore, a control unit may be provided which is designed to approach a predefined angle position via the drive unit. In other words, the control unit should be designed in such a manner that it receives a defined angle position, and the control unit then approaches this through corresponding rotation and subsequent repeated deceleration of the shaft of the jet engine. This control unit and/or an additional control unit are preferably furthermore designed, in the case of the variant with an extension arm, to use the extension arm to dampen any possible rotational vibrations that may occur through suitable deflection of the extension arm.

In a second embodiment, the device according to the invention for driving a shaft of a jet engine for inspection purposes comprises a drive unit with a clamping element for the detachable and non-destructive fastening of the drive unit to a fan blade of the jet engine and a friction wheel driven by the drive unit, the friction wheel being designed to lie against the housing of the jet engine. The drive unit in this embodiment is fastened to a fan blade arranged on the shaft non-rotatably and allows the desired rotation of the shaft, in that a friction wheel running along the housing of the jet engine is driven.

The clamping element preferably comprises three point clamps arranged in a triangle. The two clamping jaws of the point clamps in each case may be arranged on opposite sides of a U-shaped section, for example. Through the corresponding embodiment, the clamping element can be variably adapted to any fan blade shape at random, as a result of which the device has extremely varied application possibilities. With a corresponding clamping element, it is sufficient for the device only to be fastened to the inlet edge of a fan blade; this means that an additional fastening component, for example one engaging at the rear edge of the fan blade, is no longer necessary. The variability can be further increased when at least one of the point clamps has adjustable clamping jaws on both sides.

In order to create sufficient contact between the friction wheel and housing of the jet engine, it may be provided that the friction wheel is pressed against the housing using a spring element. It is preferable in this case for a lockable ball joint to be provided between the clamping element and the spring element, with which ball joint the relative position of the clamping element and spring element can be adjusted. In this way, the direction of the contact pressure of the contact between the friction wheel and housing of the jet engine achieved by the spring element can be adjusted.

It is furthermore preferable for the spring element to be fixed selectively in the compressed state, which allows a load-free mounting of the device. Once the mounting has taken place, the fixing can be detached, as a result of which the spring element relaxes and the friction wheel is pressed against the housing of the jet engine. Alternatively or in addition, the spring element may also be adjustable in terms of the spring force.

It is also preferable for the device to have a coupling for connecting an external power supply. When using the device according to the invention, it should be assumed in principle that there is a power connection in the vicinity of the engine which can be used as a power supply. This means that the device no longer needs its own energy storage device and can have a correspondingly more lightweight design. However, it is of course possible for the device to be supplied with electrical energy via an external mobile energy storage device via the coupling.

It is preferable for the coupling to be rotatable in respect of the clamping element, this being achievable with the help of a slip-ring arrangement, for example. A cable connected to the coupling is thereby prevented from twisting or kinking when the device is used.

It is preferable for the device to have an angle transmitter for determining the angle of the drive unit in relation to the perpendicular. Furthermore, a control unit may be provided which is configured for approaching a predefined angle position via the drive unit. In other words, the control unit should therefore be designed to adjust a predefined angle position through suitable control of the drive unit. The angle position in this case initially relates to the angle of the device in relation to the perpendicular, although it can easily be converted into any other defined angle position of the shaft of the jet engine. Often all this requires is for a constant deviation to be added on.

Irrespective of the final embodiment, the invention offers a device for driving a shaft of a jet engine for inspection purposes, which is easy to use and can be produced cost-effectively due to the low complexity. In this case, the device enables a shaft of a jet engine to be driven for inspection purposes without a second technician having to be deployed ultimately to turn the shaft. Instead, an inspection of the turbine blades of a low-pressure turbine, which routinely required two technicians in the prior art, can now be carried out by a single technician.

A first exemplary embodiment of a device 1 according to the invention is depicted in FIG. 1.

The device 1 is designed to drive the shaft 81 of a jet engine 80, the spinner 82, of which is the nose cone of the jet engine 80, which can be seen from the outside, and to which the fan blades 83 are fastened in a non-rotatable manner.

The device 1 comprises a drive unit (drive) 10 having two parts 11, 12, which are rotatable relative to one another, one part 11 of which co-rotates with the shaft 81 of the jet engine 80, whereas the other part 12 does not co-rotate.

The co-rotating part 11 is designed to lie against the spinner 82 of the shaft 81 and has a negatively shaped bearing surface adapted to the shape of the spinner 82 for this purpose. In order to improve the grip between this bearing surface and the spinner 82, an element 20 improving grip in the form of a cap made of a rubber-like elastomer that can be fitted over the spinner 82 is provided between the co-rotating part 11 of the drive unit 10 and the spinner 82.

The drive unit 10, or else the co-rotating part 11 of the drive unit 10, is fastened via tightly tensioned straps 13, which are fixedly connected to the co-rotating part 11 at their one end, and have hook elements 14 at the other end, which engage at the rear edges of individual fan blades 83 of the jet engine 80. A non-rotatable connection therefore results between the co-rotating part 11 of the drive unit 10 and the shaft 81 of the jet engine 80 through the straps 13 and the element 20 which improves grip.

The non-co-rotating part 12 of the drive unit 10 is supported in such a manner on the inside of the housing 84 of the jet engine via a telescopic linkage assembly 15 that it is stationary in respect of the housing 84, in other words it has neither a translational nor a rotational degree of freedom in respect of the housing 84. By rotating both parts 11, 12 of the drive unit 10 in respect of one another, a rotation of the shaft 81 of the jet engine 80 is thereby achieved.

In order to control the rotational movement of the shaft 81, a control unit (controller) 30 is provided with which the drive unit 10 can be controlled. The control unit 30 in this case receives information on the angle position of both parts 11, 12 of the drive unit 10 in relation to one another from an angle transmitter arranged in the drive unit 10, which information—where necessary taking account of a predefined constant deviation—is shown on a display 31 on the control unit 30. It is also possible to specify a desired angle position of the two parts 11, 12 of the drive unit 10 in respect of one another, or possibly taking account of a predefined constant deviation of the shaft 81 of the jet engine 80, on the control unit 30 by means of a control dial 32, wherein the control unit 30 is designed to control the drive unit 10 suitably in order to achieve this angle position.

A second exemplary embodiment of a device 1 according to the invention is depicted in FIG. 2. This device 1 also comprises a drive unit 10 with two parts 11, 12 which are rotatable relative to one another, one part 11 of which co-rotates with the shaft 81 of the jet engine 80, whereas the other part 12 does not co-rotate.

For the basic design of the co-rotating part 11 of the drive unit 10 and also for the element 20 arranged between this part 11 and the spinner 82, reference is made to the corresponding embodiments in FIG. 1.

The co-rotating part 11 of the drive unit 10 is also fastened by straps 13 in the case of the device 1 according to FIG. 2. These straps 13 are fixedly connected by their one end, detachably by the other end, to the part 11 of the drive unit 10 in question, so that they can be placed about individual fan blades 83 of the jet engine 80 in a streamlined manner, as depicted. By means of the tightly tensioned straps 13—as has already been explained in connection with FIG. 1—a non-rotatable connection is achieved between the co-rotating part 11 of the drive unit 10 and the shaft 81 of the jet engine 80.

On the non-co-rotating part 12 of the drive unit 10, an extension arm 16 is provided, to the free end of which a counterweight 17 is fastened. The extension arm 16 is depicted as an actual arm in the exemplary embodiment shown; it is also possible, however, for the extension arm 16 to be directly formed by the housing of the non-co-rotating part 12 of the drive unit 10, for example in that the counterweight 17 is fastened on the other side of the rotational axis directly to the housing.

By deflecting the extension arm 16 from the perpendicular, a torque can be applied to the shaft 81 of the jet engine 80, which ultimately leads to the desired rotation of the shaft 81. The described deflection can be achieved through the rotation of the two parts 11, 12 of the drive unit 10 in relation to one another, wherein the inertia of the shaft 81 of the jet engine 80, to which the co-rotating part 11 is fastened in a non-rotatable manner, is utilized.

The control device 30 is configured in the same way as that in FIG. 1, which is why reference is made to the corresponding remarks. Apart from the angle transmitter already described, the control device 30 also receives additional information on the angle position of the extension arm 16 in relation to the perpendicular. An angle position of the shaft 81 of the jet engine 80 can be calculated from this information and also controlled as a consequence. Moreover, the aforementioned information on the angle position allows any rotational vibrations that may occur during the braking of a rotational movement of the shaft 81, for example, to be damped. The corresponding damping is directly controlled by the control device 30, in that the extension arm 16 is controlled in the opposite direction accordingly.

Figure 3:
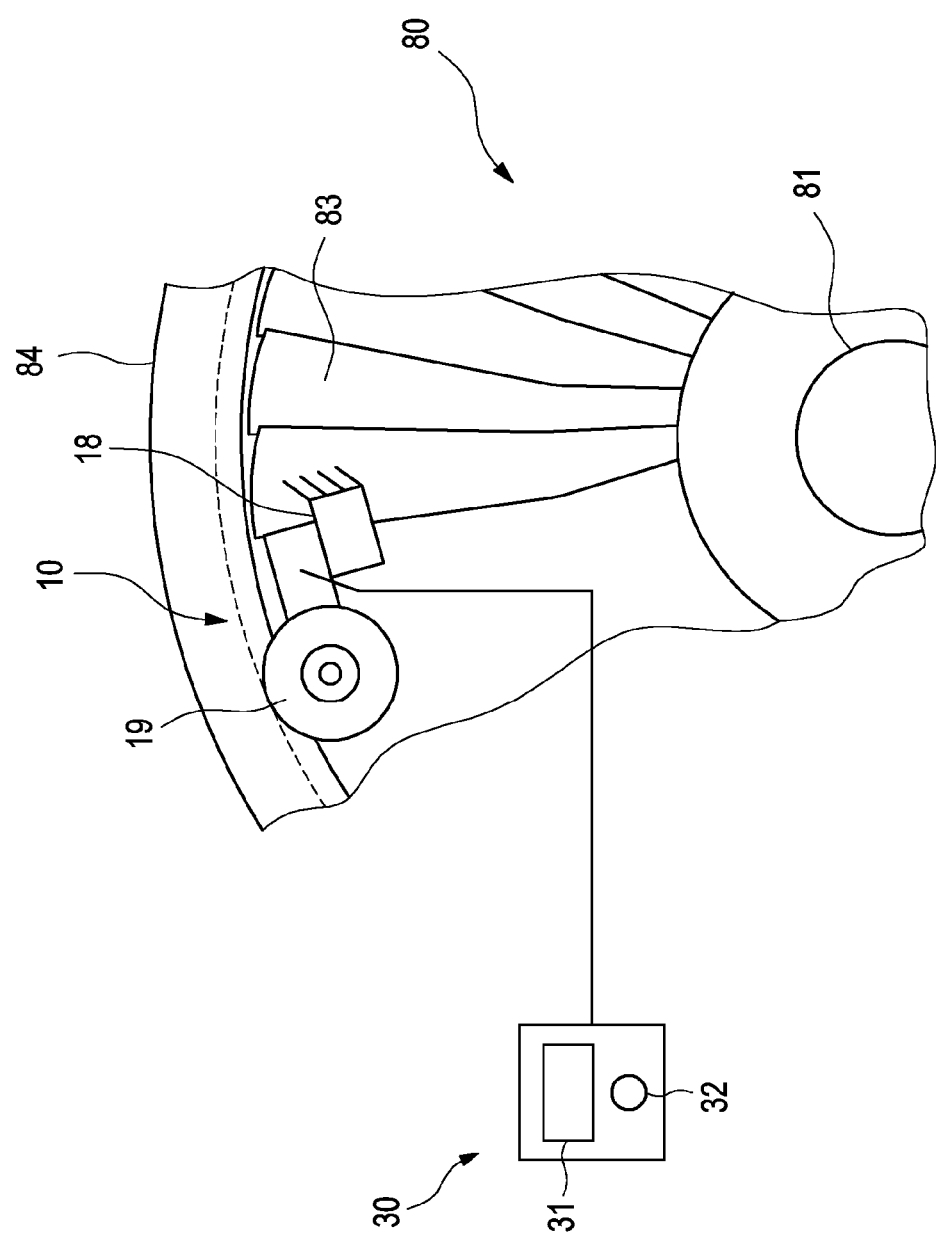
FIG. 3 shows a third exemplary embodiment of a device according to the invention.

In FIG. 3, a further device 1 according to the invention for driving the shaft 81 of a jet engine 80, the spinner 82 of which is the nose cone of the jet engine 80 which is visible from outside.

The device 1 comprises a drive unit 10 having a clamping element (clamp) 18 with which it can be fastened to the free end of a fan blade 83 in a detachable and non-destructive manner. Alternatively, the clamping element 18 may also be configured for clamping between two adjacent fan blades 83.

Furthermore, the drive unit 10 comprises a friction wheel 19 which is pressed against the inside of the housing 84 of the jet engine by a spring element which is internal and cannot therefore be seen. By driving the friction wheel 18, a rotation of the fan blade 83, and the shaft 81 connected thereto in a non-rotatable manner, is achieved.

The drive unit 10 comprises an angle transmitter, which supplies an angle position of the drive unit 10 in relation to the perpendicular. This information can be used by a control unit 30, such as the one described in connection with FIGS. 1 and 2, to control the drive unit.

Figure 4:
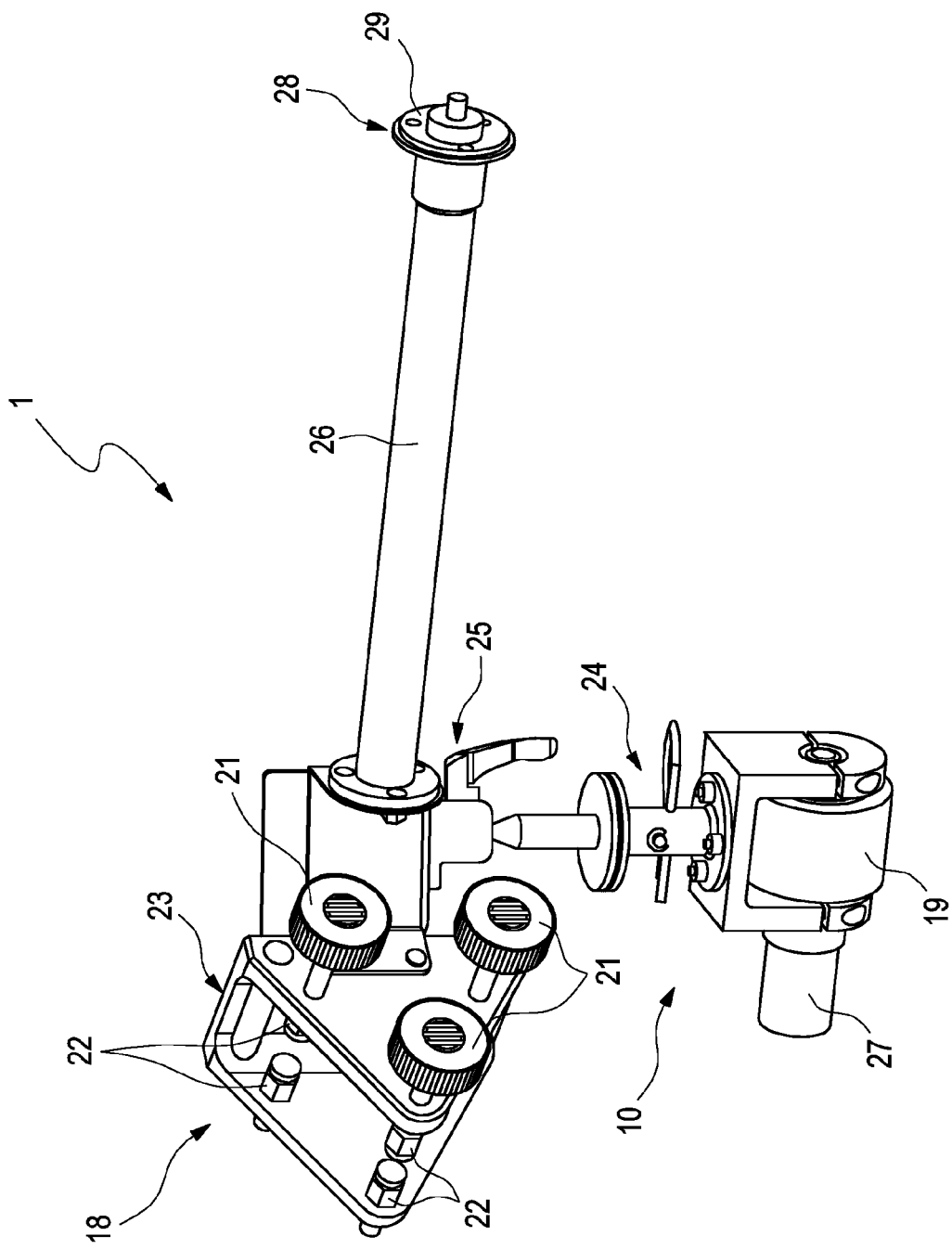
FIG. 4 shows a fourth exemplary embodiment of a device according to the invention.

FIG. 4 shows a fourth exemplary embodiment of a device 1 according to the invention which is used in principle in a comparable manner to the device according to FIG. 3, which is why reference is made to the comments on use in this respect and only the special characteristics of the structure of the device 1 according to FIG. 4 are looked at in the following.

The clamping element 18 with which the device 1 can be fastened to the input edge of a fan blade 83 comprises three point clamps 21 arranged in a triangle, the clamping jaws 22 of which are arranged in each case on opposite sides of a U-shaped section 23.

Between the clamping element 18 and the friction wheel 19 a spring element 24 is provided, with which the friction wheel 19 can be pressed onto the housing 84 of the jet engine 80 when using the device 1. In order to be able to adjust the direction of the pressing force in this case, a lockable ball joint 25 is provided between the clamping element 18 and the spring element 24. Using this ball joint 25, the spring element 24 and therefore the friction wheel 19 can be tilted in respect of the clamping element 18 and the direction of the contact force of the friction wheel 19 against the housing 84 of the jet engine 80 can thereby be adjusted.

In order to facilitate a force-free mounting of the device 1, the spring element 24 has a fixing 24' in the form of a split pin. If the spring element 24 is manually compressed and then the fixing 24' is passed through suitable openings in the spring element 24, the spring element 24 remains compressed until the fixing 24' is drawn out again. The device 1 may be mounted in a force-free manner in the case of the fixed spring element 24. The contact force of the friction wheel 19 against the housing 84 of the jet engine 80 needed for use is achieved after the fixing 24' has been pulled out.

The device 1 furthermore comprises a cable guide 26 with internal cables for supplying the drive unit 27 of the friction wheel 19 with electrical energy, and also data lines for an—internal—angle transmitter. At the free end of the cable guide 26, a slip ring arrangement 28 is provided with a coupling 29 arranged directly thereon for connection of an external power supply and external data line. The slip ring arrangement 28 enables the device to be operated using an external power source and/or control unit, which is why the device 1 itself can be handled easily and therefore effectively.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for driving a shaft of a jet engine for inspection purposes, the device comprising:
   a drive comprising a part co-rotating with the shaft,
   wherein the co-rotating part of the unit is configured to lie against a spinner of the shaft and is secured in a non-rotatable manner to at least one fan blade arranged on the shaft using at least one strap.

2. The device as claimed in claim 1,
   wherein the non-co-rotating part of the drive comprises a linkage assembly configured to be supported against the housing of the jet engine.

3. The device as claimed in claim 1,
   wherein an extension arm for a counterweight is on the non-co-rotating part of the drive, the counterweight being configured to apply a torque to the shaft.

4. The device as claimed in claim 1,
   wherein the at least one strap is configured to be fastened to the co-rotating part of the drive at one end, and has a hook configured to hook to the at least one fan blade at the other end.

5. The device as claimed in claim 1,
   wherein the at least one strap is configured to be fastened to the co-rotating part of the drive at both ends, wherein one end of the at least one strap is fixedly connected to the drive.

6. The device as claimed in claim 1,
   wherein a contact surface of the co-rotating part of the drive lies against the spinner and has a surface coating for improving grip or an element for improving grip and is configured to be arranged between the co-rotating part of the drive and the spinner.

7. The device as claimed in claim 1,
   wherein the device has an angle transmitter for detecting an angle of the co-rotating part of the drive in relation to the non-co-rotating part of the drive, and a controller that is configured to control the device to approach a predefined angle position via the drive.

8. A device for driving a shaft of a jet engine for inspection purposes, the device comprising:
   a drive having a clamp for a detachable and non-destructive fastening of the drive to a fan blade of the jet engine arranged on the shaft and having a friction wheel driven by the drive, the friction wheel being configured to lie against the housing of the jet engine, and
   a spring configured to press the friction wheel against the housing of the jet engine.

9. The device as claimed in claim 8,
   wherein the clamp comprises three point clamps arranged in a triangle, two clamping jaws of which are arranged on opposites sides of a U-shaped section.

10. The device as claimed in claim 8,
    wherein the spring is configured to be fixed selectively in a compressed state for load-free mounting.

11. The device as claimed in claim 8,
    comprising a lockable ball joint between the clamp and the spring that is configured to adjust a relative position of the clamp and the spring.

12. The device as claimed in claim 8,
    wherein the device has a coupling configured to connect an external power supply.

13. The device as claimed in claim 8,
    wherein the device has an angle transmitter for determining an angle of the drive in relation to the perpendicular, wherein a controller is configured to control the device for approaching a predefined angle position via the drive.

14. The device as claimed in claim 9, wherein two clamping jaws of the three point clamps are arranged on opposites sides of a U-shaped section.

15. A device for driving a shaft of a jet engine for inspection purposes, the device comprising:
    a drive having a clamp for a detachable and non-destructive fastening of the drive to a fan blade of the jet engine arranged on the shaft and having a friction wheel driven by the drive, the friction wheel being configured to lie against the housing of the jet engine,
    a spring configured to press the friction wheel against the housing of the jet engine, and
    a lockable ball joint between the clamp and the spring that is configured to adjust a relative position of the clamp and the spring.

* * * * *